(No Model.)
B. G. LAMME.
DIRECT CURRENT DYNAMO ELECTRIC GENERATOR.
No. 573,009. Patented Dec. 15, 1896.
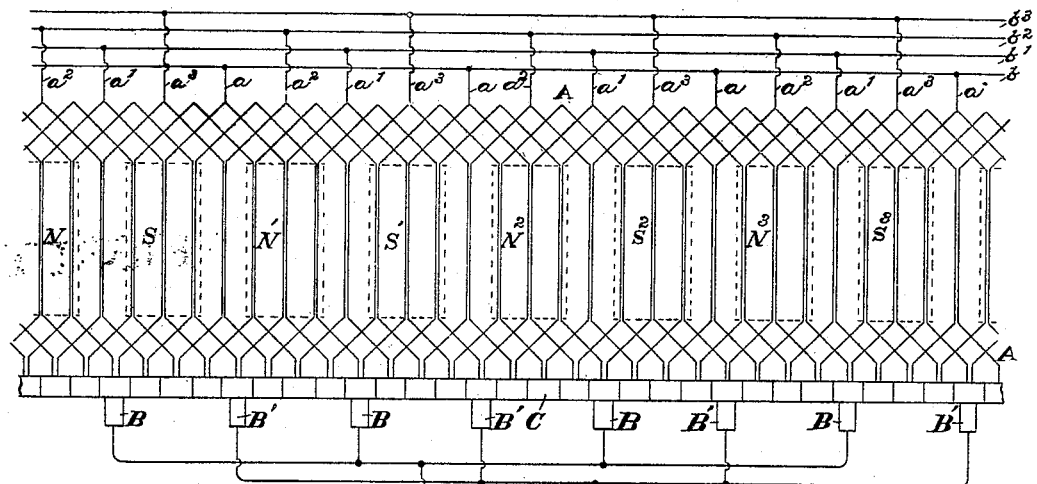
Fig. 1.
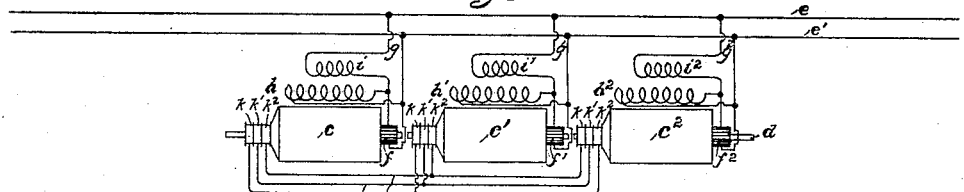
Fig. 3. Fig. 2. Fig. 4.
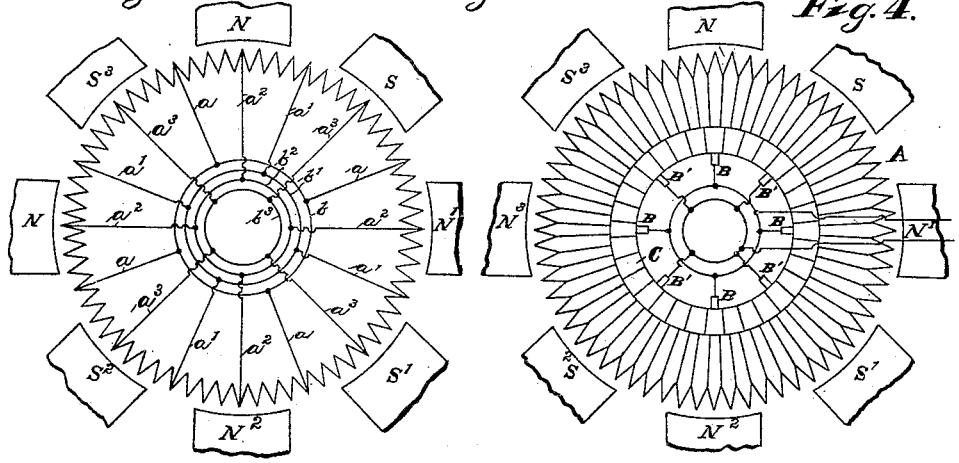
WITNESSES:
Ethan I. Dodds
Hubert C. Tener
INVENTOR
Benjamin G. Lamme
BY
H. G. Carr
ATTORNEY.

UNITED STATES PATENT OFFICE.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

DIRECT-CURRENT DYNAMO-ELECTRIC GENERATOR.

SPECIFICATION forming part of Letters Patent No. 573,009, dated December 15, 1896.

Application filed March 11, 1896. Serial No. 582,766. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Direct-Current Dynamo-Electric Generators, of which the following is a specification.

My invention relates to multipolar direct-current generators having parallel-wound armatures; and it has for its object to provide a method and means whereby the magnetic circuits of such machines may be automatically balanced.

In multipolar direct-current generators the field-magnet poles should be all of the same strength in order that they may exert the same magnetic effect upon the armature. It sometimes happens, however, that one pole is weaker or stronger than the others, and when this condition is present the avoidance of serious disturbances in the operation of the machine necessitates the employment of some means for correcting the inequalities in the magnetic circuits. As the different sections of the armature-winding are connected in parallel through the brushes and their connecting-leads, if the magnetic circuits are not properly balanced current will flow from the sections of higher electromotive force through the brushes and their connecting-leads to the sections having lower electromotive force. The reaction upon the field due to such currents will serve to distort it and thus cause an increased difference between the electromotive forces in the different sections of the armature-winding. The disturbance of the armature-circuits, which tends to unbalance the machine, may be due to any one of a variety of causes, such, for example, as the unequal wear of bearings and consequent displacement of the armature with reference to the poles of the field-magnet, defective castings, unequal field-magnet coils, a wrong lead of the commutator-brushes, an unequal rate of increase or decrease of the polar strengths, with changes in electromotive force, due to changes in load and consequent changes in the series ampere-turns on the field-magnets.

In a parallel-wound armature as ordinarily constructed the different armature-circuits are to a certain extent independent of each other, and variations in the strength of one of the field-magnet poles will vary the magnetic circuits of which it forms a part. Variations in the electromotive forces of the corresponding armature-circuits necessarily result, and such variations may give rise to local currents which will injuriously affect the operation of the generator. This unbalancing of the armature-circuits is due to the fact that the section or sections having the higher electromotive force will send currents through the brushes and brush-holder leads to and through the circuits of lower electromotive force, or the circuits having higher electromotive force may furnish the greater part of the current to the external circuit, while the circuits having lower electromotive force may do almost nothing. If the conditions are such that the current is merely unequally divided between the armature-circuits, then those carrying the greater currents will cause a greater distortion of their respective field magnetizations, and a consequent reduction in strength, provided the armature-teeth or the pole tips or faces are partially saturated; but if the current feeds back through the circuit or circuits having the lower electromotive force there will also be distortion and consequent weakening of the corresponding pole or poles. If several circuits having a higher electromotive force are feeding into one having a lower electromotive force, the latter is subject to greater distortion and weakening than the former, since it carries a greater current. Therefore the unbalancing effect increases until the local currents in the armature reach an excessive amount.

The structure of a parallel-wound multipolar armature is such that it may be represented by a series of direct-current bipolar armatures running at equal speeds and connected in parallel. If such a series of bipolar armatures are running at exactly the same speed in fields of exactly the same strength, they will feed equally into mains common thereto. If one of the fields is weaker or stronger than the others, however, there will be an unequal division of current between the armatures, and some may even feed back through the others. By adjusting the field strengths of one or more of the machines or by otherwise adjusting the magnetic circuits a restoration of the necessary balance between them might be effected. If a series of alternating-current generators are arranged in the same manner to run at exactly the same speed and connected in similar phase relations, the armatures may be connected to the same mains and run with fairly well balanced circuits, even with considerable differences in the strengths of their respective fields, this condition being due to the fact that the currents in the different armatures are flowing at different phase relations and are leading or lagging with reference to their respective electromotive forces and are thus magnetizing or demagnetizing their field-magnets in such a way as to effect the necessary balance between them. If commutators be attached to such a series of machines or direct-current windings with commutators be added to these armatures, they will be found capable of delivering direct current to their mains with very little unbalancing, even with unequal field strengths. The alternating-current leads need not be connected to an external work-circuit, but may merely serve for the passage between the armatures of the several machines of leading and lagging currents. This balancing effect due to the flow of leading and lagging currents between generators arranged to run at the same speed I propose to secure in a parallel-wound multipolar armature by electrically connecting a small number of points of normally equal potential by means of leads through which leading and lagging currents may be conducted to weaken or strengthen the several magnetic circuits, as may be necessary, and thus secure the necessary balance in the machine.

A plurality of compound-wound generators provided with my balancing means and run in synchronism may have their armatures connected by alternating-current leads, as indicated above. By this means each machine will be compelled to carry its share of the load and the equalizer ordinarily employed in such relations may be dispensed with.

In the accompanying drawings, Figure 1 is a diagrammatical development of the winding of a parallel-wound armature for an eight-pole generator provided with my balancing means. Fig. 2 is a diagram of three direct-current compound-wound generators connected in parallel with an external circuit and having their armatures connected by alternating-current leads. Fig. 3 is a diagram of an eight-pole machine, showing the balancing-conductors; and Fig. 4 is a similar diagram showing the commutator and brush connections.

Reference being now had to Figs. 1, 3, and 4 of the drawings, N S, N' S', N S$^2$, and N$^3$ S$^3$ are the field-magnet poles, and A the armature-winding, of an eight-pole direct-current generator. B and B' are the brushes, and C the commutator-cylinder. The alternate brushes are electrically connected together and to the external circuit, as is usual in such machines. In Fig. 4 the brushes are shown as bearing upon the inner surface of the commutator-cylinder merely for convenience of illustration. The armature-winding A is connected by means of conductors $a$, $a'$, $a^2$, and $a^3$ to rings $b$, $b'$, $b^2$, and $b^3$, which may be located at any convenient place with reference to the coils, the points of normally equal potential being connected with the same ring. As shown in the drawings, these points which are electrically connected together by means of the leads and rings are ninety degrees apart. This arrangement I have found to be one which will balance the circuits of a machine satisfactorily, and in many cases three points at one hundred and twenty degrees apart would give fairly satisfactory results.

As has already been stated, if one of the field-magnet poles, as, for example, the pole N, should be weaker or have a less magnetizing effect upon the armature than any of the other poles the electromotive forces generated in the sections of the armature adjacent to the stronger poles would by reason of the parallel winding drive back through the section adjacent to the pole N and tend by the reaction to still further weaken this pole. This weakening effect would also be communicated in a less degree to the poles S and S$^3$ on the two sides of the pole N. By reason of the connections involved in my present invention, however, the leading and lagging alternating currents will serve by their magnetizing and demagnetizing effect to maintain or restore the desired balance among the several magnetic circuits.

Fig. 2 illustrates three direct-current machines having their armatures connected for the transmission from one to the other of alternating currents. $c$, $c'$, and $c^2$ are the direct-current armatures, the windings of which are not shown. It is to be understood, however, that the winding of each armature is provided with balancing connections like those shown in Figs. 1 and 3, except that the connections are made at three points one hundred and twenty degrees apart instead of at four points ninety degrees apart. These armatures are all connected in parallel with mains $e$ $e'$ through commutators $f$ $f'$ $f^2$ and leads $g$ $g'$ $g^2$. $h$, $h'$, and $h^2$ are the shunt and $i$, $i'$, and $i^2$ the series field-magnet coils for the respective machines. Each of the armatures is provided with a set of three collector-rings $k$ $k'$ $k^2$, the corresponding rings of the three sets being connected by leads $l$, $l'$, and $l^2$. As the conductors (not shown) which correspond to the conductors $a$, $a'$, $a^2$, and $a^3$ of Figs. 1 and 3 are connected to the rings $k$, $k'$, and $k^2$ and the rings of the several machines are connected by the leads $l$, $l'$, and $l^2$, the armatures will not only supply direct current to the mains $e\ e'$ in parallel, but will be maintained substantially in balance irrespective of variations in their field strengths, provided they run at substantially the same speed. Each machine will therefore carry its own share of the load, and the results attained will be the same as those heretofore secured by means of equalizing-wires.

When a plurality of direct-current generators are connected in parallel to distributing-mains and provided with balancing connections, as indicated in Fig. 2 of the drawings, it is understood that the armatures are to be run at substantially the same speed. Such being the case there will be no electromotive force generated by any of the machines which will serve to transmit true energy through the alternating-current leads to the other machine or machines. Any tendency to unbalance the system will necessarily be due to differences in the field magnetizations of the different generators, and this tendency will be corrected by the transfer of leading and lagging currents through the alternating-current leads in the manner already pointed out. It follows, therefore, that the necessary balance will be maintained by the transfer of apparent energy only between armatures of the several generators.

If only two alternating-current leads were employed in such an arrangement instead of three, the balancing effect would take place, but it would be intermittent or pulsating in effect. With three leads arranged one hundred and twenty degrees apart the effect is more nearly constant, and with four leads at ninety degrees, as indicated in Figs. 1 and 3 of the drawings, the balancing effect is as nearly uniform as is necessary in practice. It follows, therefore, that a multipolar parallel-wound armature should have at least three alternating-current leads, and in many cases four would be preferable. As this method of balancing involves the utilization of armature reaction, the best results will be attained in connection with the slotted iron-clad type of armature with a small air gap or clearance between the armature and field-magnet poles and with an armature which is relatively powerful with respect to the field-magnet.

Another advantage incident to the invention is that it diminishes the iron losses to some extent. Such losses being dependent upon the maximum induction exerted by the strongest pole, they will be diminished by making the poles of equal strength.

I claim as my invention—

1. A parallel-wound armature for multipolar direct-current machines provided with alternating-current connections between points in its winding of normally equal potential through which leading and lagging currents may be transmitted to equalize the magnetic circuits of the machine.

2. The method of equalizing the magnetic circuits of a multipolar direct-current machine having a parallel-wound armature which consists in setting up and transmitting leading and lagging currents between a plurality of sections of the armature-winding of normally equal potential.

3. The method of equalizing the magnetic circuits of a parallel-wound multipolar direct-current machine which consists in producing leading and lagging multiphase currents and transmitting the same between and through different sections of its armature-winding of normally equal potential.

4. A parallel-wound armature for multipolar direct-current machines provided with a plurality of connections between different portions of its winding of normally equal potential through which leading and lagging currents may be transmitted to equalize the magnetic circuits of the machine.

5. In a multipolar direct-current dynamo-electric machine, the combination with the field-magnet, of a parallel-wound armature and a plurality of conducting-rings each connected to the winding at a plurality of equidistant points, whereby apparent energy may be transmitted to equalize the magnetic circuits of the machine.

6. In a multipolar direct-current generator, a parallel-wound armature having alternating-current leads connecting a plurality of points of normally equal potential.

7. A multipolar direct-current generator having a parallel-wound armature provided with balancing alternating-current leads connecting points in the winding ninety degrees apart.

8. A plurality of direct-current generators mechanically driven at approximately the same speed and connected in parallel to direct-current mains and alternating-current leads connecting their armature-windings, whereby the machines are maintained in balance.

9. A plurality of direct-current generators having parallel-wound armatures each of which has alternating-current connections between points of normally equal potential in combination with alternating-current leads connecting said armature-windings.

10. A plurality of direct-current generators mechanically driven at approximately the same speed and connected in parallel to direct-current mains and each provided with armature-balancing conductors connecting points in its winding of normally equal potential and all connected by alternating-current leads, whereby the machines are maintained in balance.

In testimony whereof I have hereunto subscribed my name this 7th day of March, A. D. 1896.

BENJ. G. LAMME.

Witnesses:
WESLEY G. CARR,
HUBERT C. TENER.